United States Patent [19]

Kikkawa et al.

[11] Patent Number: 5,059,224
[45] Date of Patent: Oct. 22, 1991

[54] ROOM AIR CLEANER FOR USE IN AUTOMOBILES

[75] Inventors: Tatsuo Kikkawa, Omihachiman; Shigeyuki Asanari, Yokaichi; Masateru Koyama, Moriyama, all of Japan

[73] Assignee: Matsushita Electric Industrial Co. Ltd., Osaka, Japan

[21] Appl. No.: 577,419

[22] Filed: Sep. 4, 1990

[30] Foreign Application Priority Data

Sep. 6, 1989 [JP] Japan .................... 1-230975

[51] Int. Cl.$^5$ ............................. B01D 53/04
[52] U.S. Cl. .................... 55/385.3; 55/274; 55/316; 55/387; 55/385.2; 98/241
[58] Field of Search ............. 55/126, 316, 318, 274, 55/385.2, 385.3, 387, 472; 98/2.11

[56] References Cited

U.S. PATENT DOCUMENTS

| | | | |
|---|---|---|---|
| 3,657,992 | 4/1972 | Minnick | 98/2.11 |
| 3,956,458 | 5/1976 | Anderson | 55/126 X |
| 4,133,652 | 1/1979 | Ishikawa et al. | 55/126 |
| 4,223,598 | 9/1980 | Suzuki et al. | 98/2.11 |
| 4,244,712 | 1/1981 | Tongret | 55/124 |
| 4,581,988 | 4/1986 | Mattei | 98/1.5 |
| 4,630,530 | 12/1986 | Eckstrom et al. | 98/2.11 |
| 4,744,289 | 5/1988 | Holter et al. | 98/2.01 |
| 4,921,509 | 1/1990 | Maclin | 55/126 X |

FOREIGN PATENT DOCUMENTS

3740133 8/1989 Fed. Rep. of Germany .
2029003 12/1980 United Kingdom .

*Primary Examiner*—Charles Hart
*Attorney, Agent, or Firm*—Panitch, Schwarze, Jacobs & Nadel

[57] ABSTRACT

A room air cleaner for use in automobiles is disclosed. The room air cleaner comprises: a housing and a cover which form a box-like body, inlet and outlet openings formed in opposite sides of the box-like body, and a discharge device, a filter, and a motor-mounted fan which are arranged in this order in said box-like body in a substantially horizontal direction starting from the side in which the inlet openings are formed. Thus, the room air cleaner achieves a low profile design of the product and thereby assures the driver of an enlarged rear view field, and is capable of operating more quietly without affecting its air suction capacity and dust collecting performance despite the low profile design.

7 Claims, 9 Drawing Sheets

ROOM AIR CLEANER FOR USE IN AUTOMOBILES

BACKGROUND OF THE INVENTION

1. Field of the Invention

The present invention relates to a room air cleaner for use in automobiles which is installed on the rear tray of a car cabin.

2. Description of the Prior Art

Room air cleaners for use in automobiles designed to remove the smoke and tobacco odors in car cabins have recently come to be installed in increasing numbers so that it is now common to see an automobile with a room air cleaner installed on the rear tray.

Figure 1:
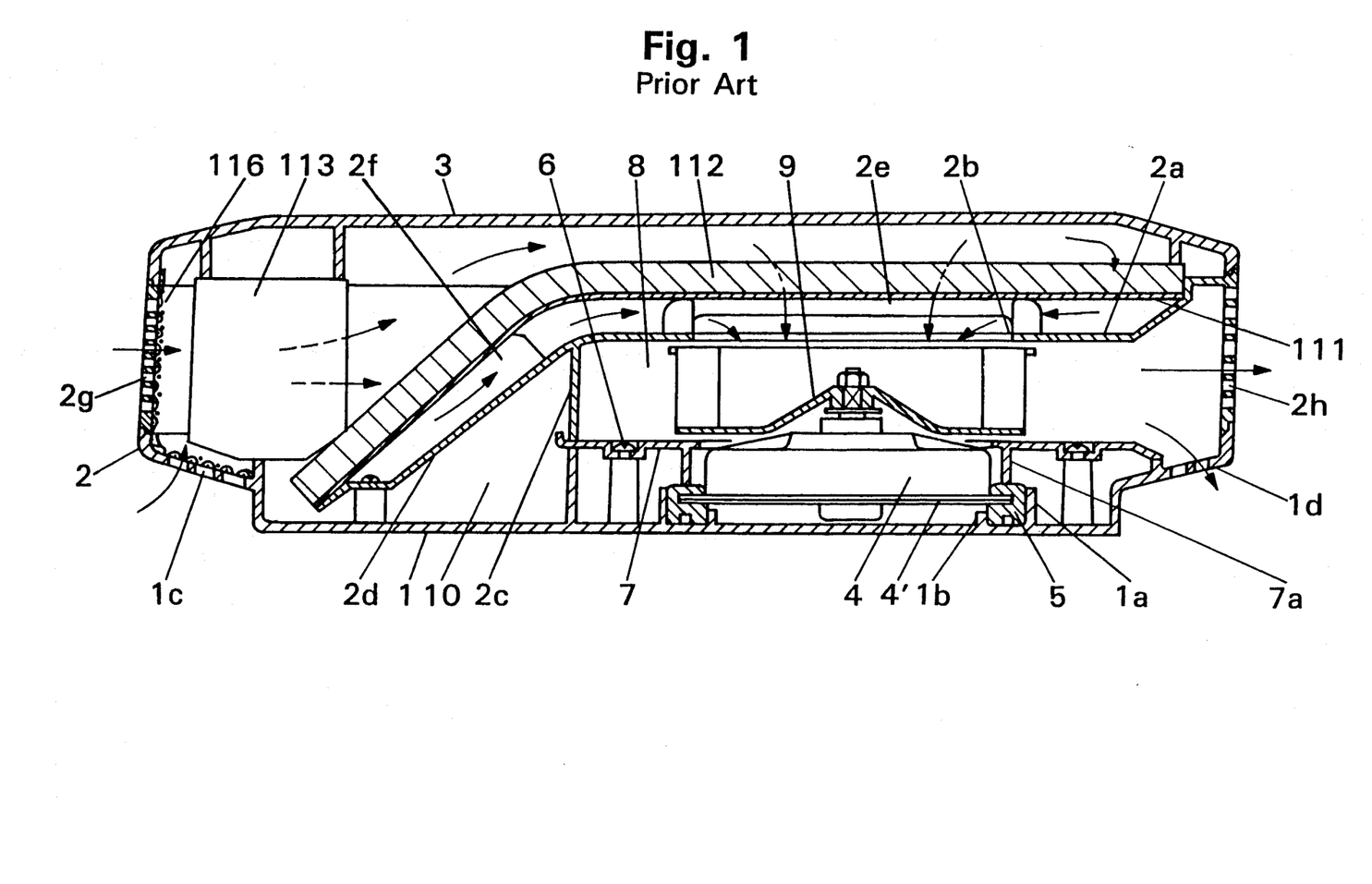
FIG. 1 is a cross sectional view of a room air cleaner according to a prior art.
Figure 2:
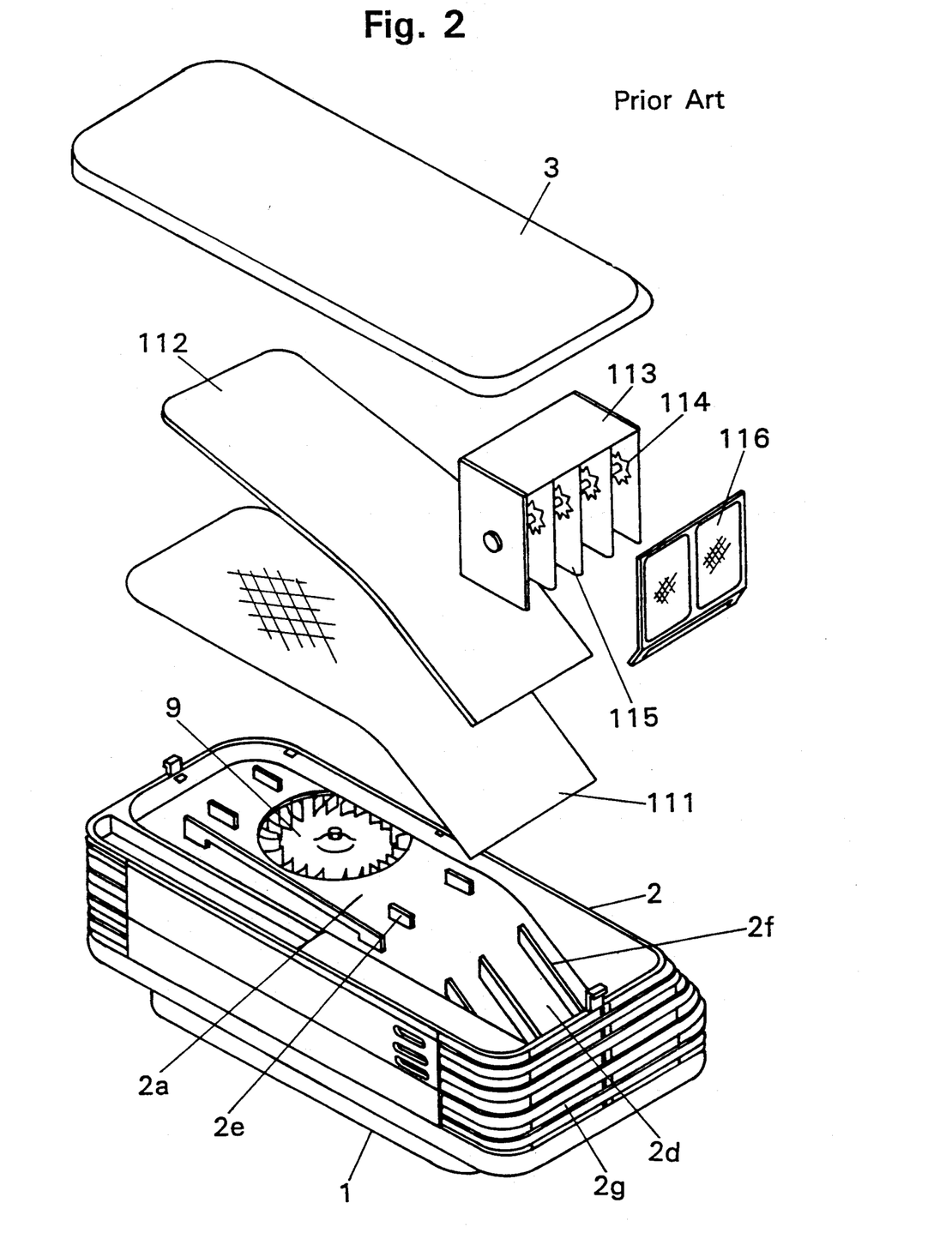
FIG. 2 is an exploded view in perspective of the room air cleaner shown in FIG. 1.

It is well known how to make a room air cleaner for use in automobiles for such purposes having a construction as shown in FIGS. 1 and 2.

The room air cleaner shown in these figures has a box-like body comprising a lower housing 1, an upper housing 2, and a cover 3, in which a vertical shaft motor 4 is mounted having a cushion member 5 attached in a substantially encircling relationship to its peripheral flange 4', the cushion member 5 being fitted between projecting ribs 1a and 1b on the lower housing 1 and retained by a rib 7a provided on a partition 7 secured to the lower housing 1 with a screw 6. A suction opening 2b is provided in the top surface 2a of the upper housing 2, while a swirl chamber wall 2c is formed thereunder extending downwardly and joining the partition 7 to form a swirl chamber 8 in which a fan 9 secured to the motor 4 is accommodated. Electrical parts (not shown), etc. are disposed in a space 10 which is formed below a sloping portion 2d extending from the top surface 2a. Ribs 2e and 2f are provided on the top surface 2a and the sloping portion 2d respectively, on which a wire net 111 and a filter 112 is mounted wire net 111 interposed. In the upper housing 2 and the lower housing 1, there are provided a number of inlet openings 2g and 1c and outlet openings 2h and 1d, both communicating with the swirl chamber 8 and respectively disposed upstream and downstream of the swirl chamber 8. The numeral 113 indicates a discharge device which has a discharge electrode 114 and a counter electrode 115 disposed facing each other and which is energized by a high voltage power supply (not shown) for corona discharge.

In the above construction, when the motor 4 is driven, air in the cabin is sucked through the inlet openings 2g and 1c, and relatively large particles of dust contained in the air are removed by a prefilter 116 mounted upstream of the discharge device 113, while fine particles of dust are given positive ions when passing through the discharge device 113 and are electrically attracted to a negatively charged filter 112 disposed further downstream thereof and consisting of a dust collecting filter and a deodorizing filter, particles of odor being caught by the deodorizing filter. As shown by arrows in FIG. 1, the thus cleaned air is passed through the space surrounded by the sloping portion 2d, the top surface 2a, and the filter 112, and is introduced into the swirl chamber 8 through the suction opening 2b before being discharged into the cabin through the outlet openings 2h and 1d.

In the prior art construction described above, the filter 112 is disposed above the suction opening 2b, which not only requires the provision of a space between the filter 112 and the top surface 2a but also makes inefficient use of the space taken by the combined height of the motor 4 and fan 9. Therefore, the overall height of the body is unnecessarily high, reducing the driver's rear view field when the room air cleaner of this construction is mounted on the rear tray of an automobile.

SUMMARY OF THE INVENTION

To overcome the above-mentioned problem, the present invention provides a room air cleaner which eliminates wasteful space in the filter, fan, motor, and circuitry sections within the body to achieve a low profile design of the product and thereby assure the driver of an enlarged rear view field, and which is capable of operating more quietly without affecting its air suction capacity and dust collecting performance despite the low profile design.

The room air cleaner of the present invention comprises: a housing and a cover which form a box-like body, inlet and outlet openings formed in opposite sides of the box-like body, and a discharge device, a filter, and a motor-mounted fan which are arranged in this order in said box-like body in a substantially horizontal direction starting from the side in which the inlet openings are formed. By this construction, the room air cleaner of the present invention can attain its intended performance while reducing the overall height of the product.

In a preferred embodiment, the filter is formed in a bent shape having its open ends facing upstream. The thus mounted filter has an overall height approximately equal to that of the discharge device, taking less space in the longitudinal direction, and allowing air to flow almost horizontally with minimum pressure loss.

In a preferred embodiment, the room air cleaner further comprises a control circuit board disposed beneath the filter for controlling the motor, and a metal shield plate forming a shroud over the control circuit board and contacting the filter to ground the filter, thus reducing the number of parts used.

In a preferred embodiment, the room air cleaner further comprises a swirl chamber shrouding the fan, a suction opening and an air opening provided respectively above and below the swirl chamber, and upper and lower blades formed on the upper and lower surfaces of a partition plate of the fan to draw air from above and below the swirl chamber, the lower blades being arranged in such a way as to encircle the motor mounted projectingly into the swirl chamber. This construction makes effective use of the space in the body as an air passage through which air drawn from above and below the swirl chamber is passed, and achieving a reduced overall height of the product by disposing the fan in such a way as to overlap the motor.

In a preferred embodiment, the room air cleaner further comprises a plurality of openings formed in approximately the middle part of the partition plate of the fan to provide airflow passages above and below the partition plate, thus achieving an increased airflow rate by assuring smooth flow of the air with minimum pressure loss.

In a preferred embodiment, the room air cleaner further comprises a tongue formed in such a manner that the airflow is split into two portions, one of which is drawn back into the fan and the other is discharged into the outlet openings. A side of the tongue facing the fan is formed from a plastic material having a smooth surface and the other side of the tongue facing the outlet openings is formed from a vibration absorbing material, thus preventing turbulence at the fan side while reducing reverberating sounds accompanying turbulent airflow at the air outlet side, and thereby achieving a quieting effect of the room air cleaner.

Other objects and advantages of the invention will become more apparent from the following detailed description.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 3:
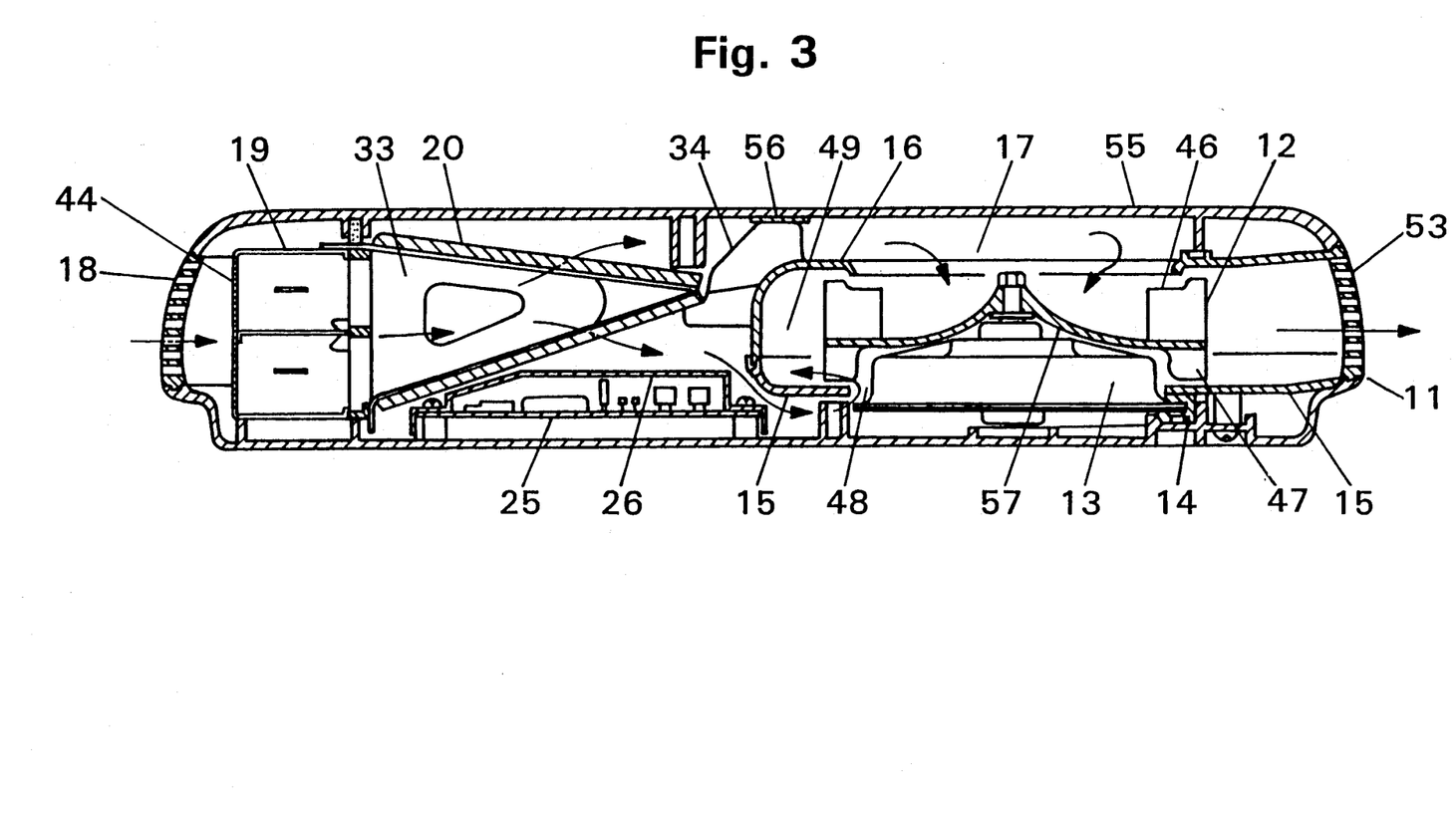
FIG. 3 is a cross sectional view of a room air cleaner of one embodiment according to the present invention.

With reference to FIG. 3, the numeral 11 indicates a room air cleaner body which contains therein a motor 13 for driving a fan 12, the motor 13 being held in position between a partition 15 and the body 11 via a support rubber 14.

As shown in FIG. 3, the fan 12 is mounted horizontally in the portion of the body 11, while a suction opening 17 provided in an inside wall 16 in the body 11 is disposed facing upward.

Figure 4:
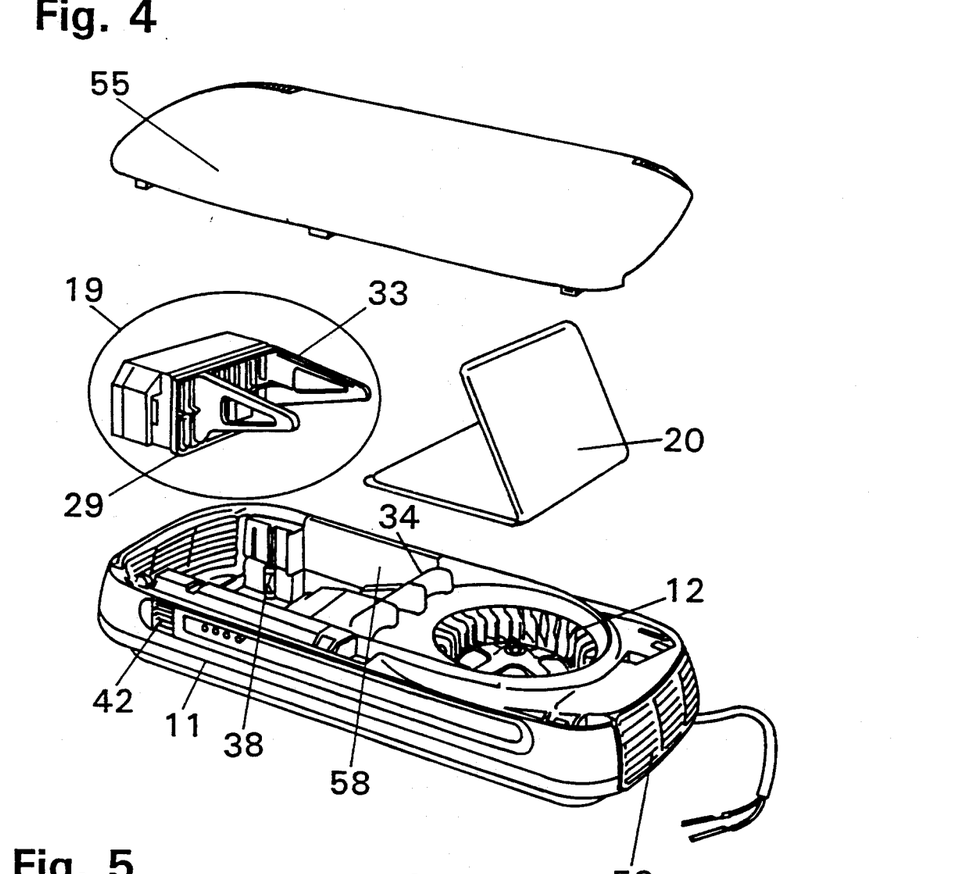
FIG. 4 is an exploded view in perspective of the room air cleaner shown in FIG. 3.

Mounted adjacent to inlet openings 18 provided on one side of the body 11 is a discharge device 19, behind which a filter 20 bent in a V-shaped form is disposed. The filter 20 when mounted has its sides fully in contact with the inner walls 58 of the body 11 (FIG. 4).

Figure 12:
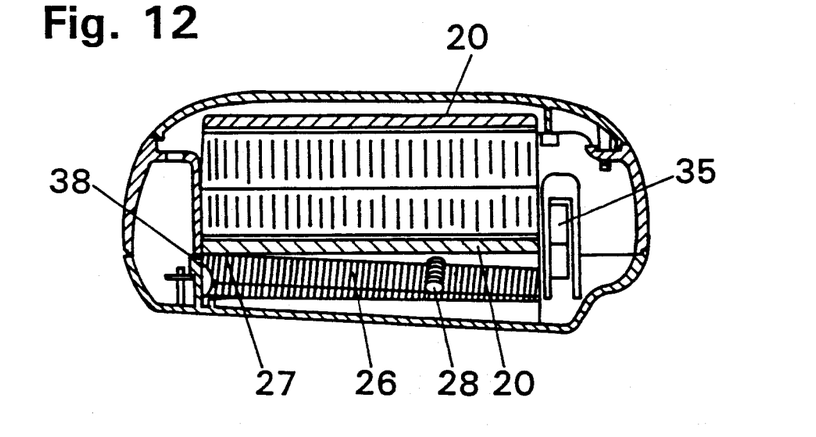
FIG. 12 is a cross sectional view of the embodiment showing the discharge device.
Figure 13:
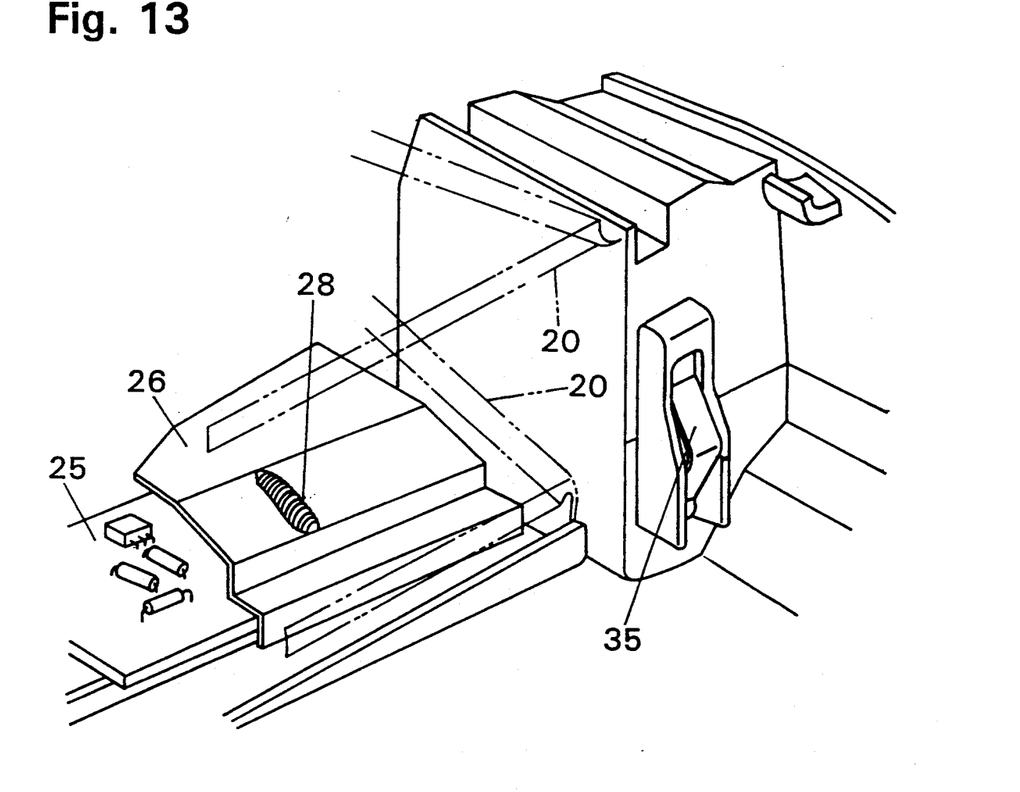
FIG. 13 is a perspective view of a portion of the embodiment showing the contact portion of a shield plate with a filter.

As shown in FIGS. 3 and 13, a control circuit board 25 for controlling the motor 13 is disposed beneath the filter 20. A metal shield plate 26 is disposed forming a shroud over the control circuit board 25, both the control circuit board 25 and the shield plate 26 slanting about 3 degrees toward the front end of the body (FIG. 12).

Further, at the side nearer to the inlet openings 18, the shield plate 26 is in contact with the lower side of the filter 20. However, since the shield plate 26 is slanted, the lower side of the filter 20 actually contacts one end 27 of the shield plate 26 and a protrusion 28 integrally provided on the shield plate 26.

Figure 9:
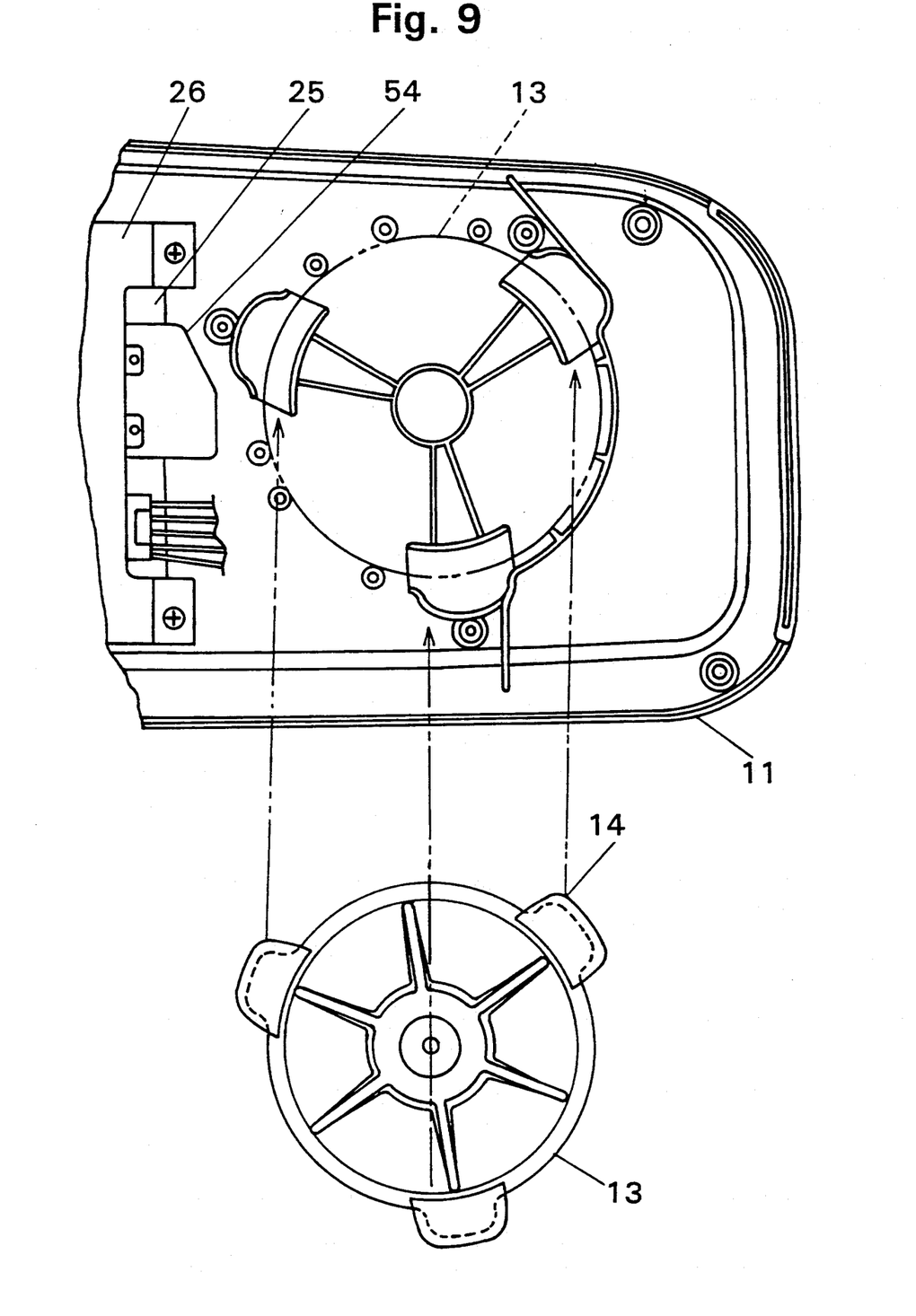
FIG. 9 is an exploded plan view showing a motor-mounted portion.

As shown in FIG. 9, a heat radiation fin 54 is directly attached to the control circuit board 25, disposing in the vicinity of an air opening 48 (FIG. 3).

Figure 7:
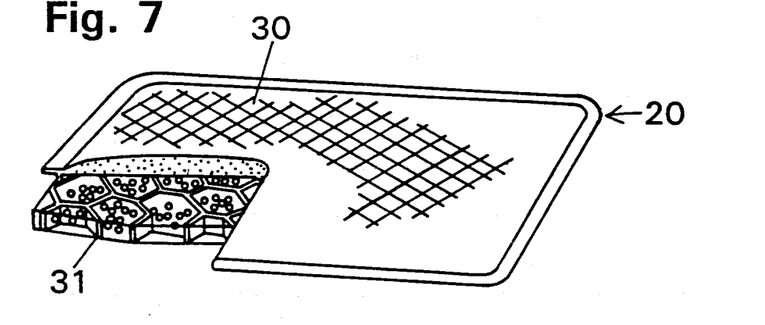
FIG. 7 is a perspective view of a filter.
Figure 8:
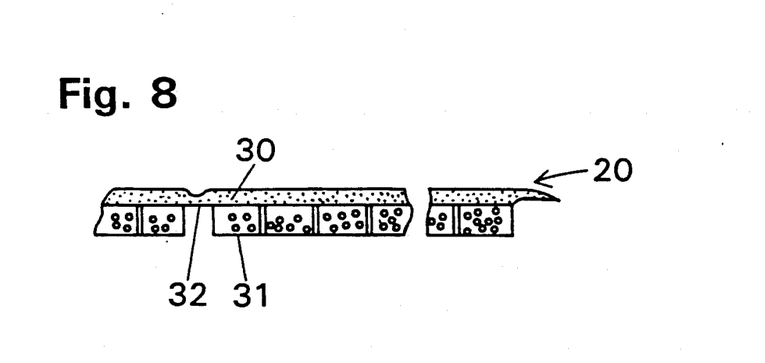
FIG. 8 is a cross sectional view of the filter.

As shown in FIG. 7, the filter 20 comprises an electrostatic filter 30 and an activated charcoal filter 31 containing activated charcoal, both being glued together. The filter 20 has a flat plate-like form in a natural state, but is provided with a thin wall portion 32 (FIG. 8) for bending in the center thereof so that the filter 20 can be easily bent into a V-shaped form.

Figure 5:
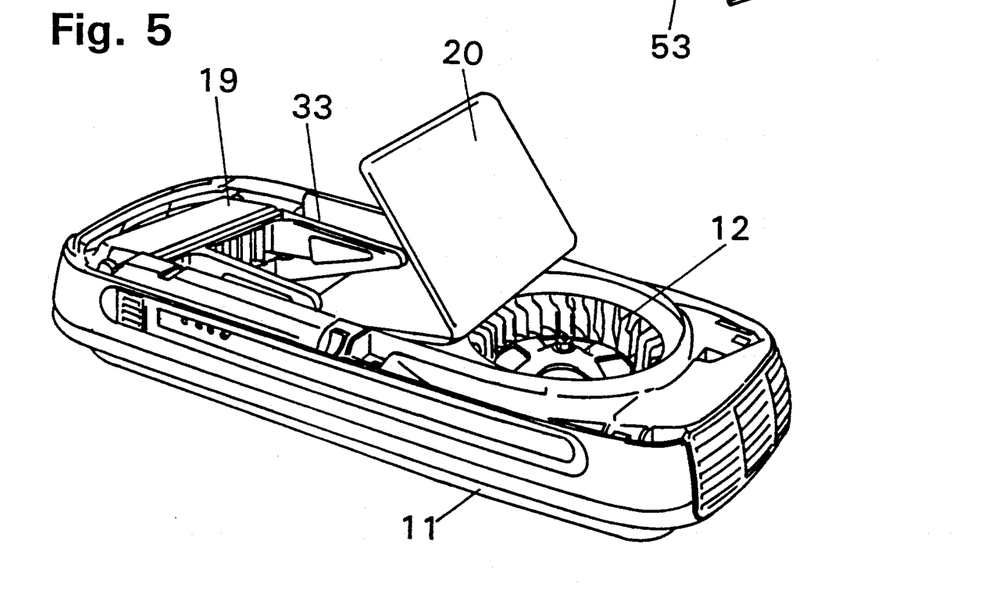
FIG. 5 is a perspective view of the room air cleaner shown in FIG. 3.

As shown in FIG. 4 and 5, the filter 20 is inserted along a guide frame 33 extending integrally from a grating 29 installed on the discharge device 19. The downstream end of the filter 20 is supported on a rib 34 to secure the filter 20 in position.

Figure 10:
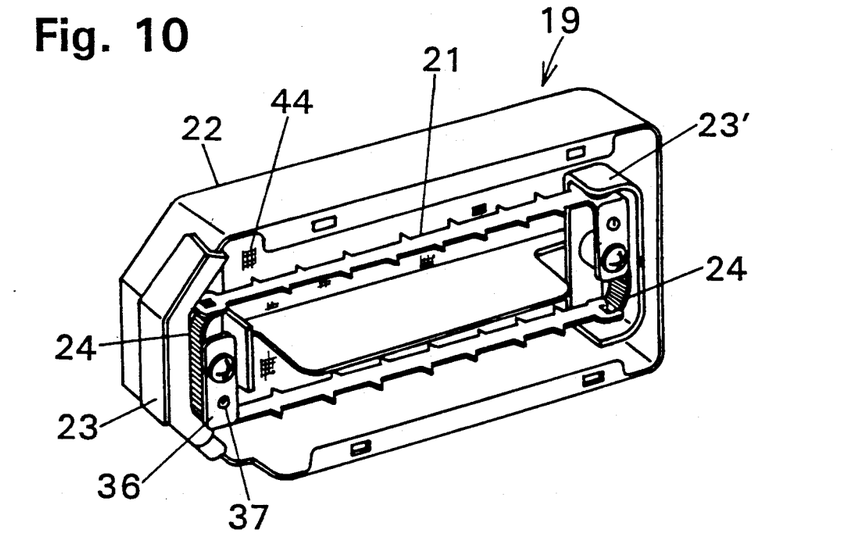
FIG. 10 is a perspective view of a discharge device.
Figure 11:
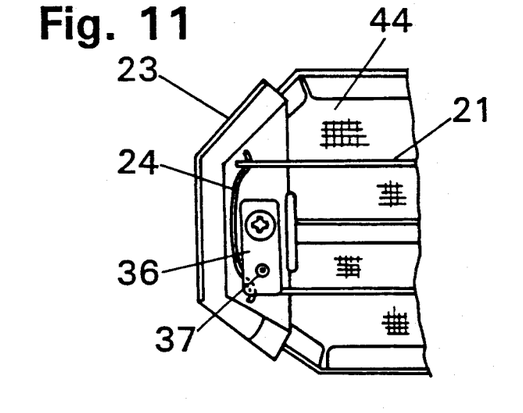
FIG. 11 is an enlarged fragmentary view of the discharge device.

As shown in FIG. 10, the discharge device 19 comprises a pair of electrodes 21 disposed parallel to each other with needle-like projections formed thereon and a ground body 22 constructed from a sheet metal formed in a box-like shape oriented in parallel with the pair of electrodes 21. The electrodes 21 are secured to insulators 23 and 23', as shown in FIG. 11, using screws in an insulating manner from the ground body 22. Also, the electrodes 21 are stretched tight by means of springs 24 applied therebetween. Attached in the upstream side of the ground body 22 is a wire net 44.

A high voltage is supplied to the discharge device 19 with a high voltage contact 35 (FIG. 13) contacting a protrusion 37 (FIGS. 10 and 11) on a plate 36 rising perpendicularly from the electrode 21, while the ground side thereof is grounded with one side of the ground body 22 contacting a contact plate 38 (FIGS. 4 and 12).

Figure 14:
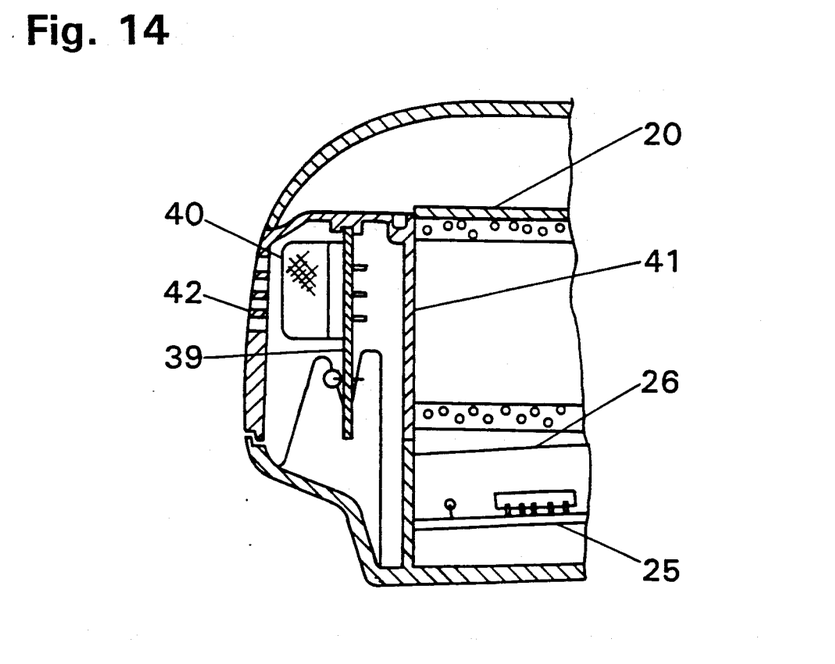
FIG. 14 is a cross sectional view showing the mounting area of a gas sensor of the embodiment.

As shown in FIG. 14, the numeral 39 indicates a printed circuit board on which a gas sensor 40 is mounted. Using the input to the gas sensor 40, the control circuit board 25 controls the input to the motor 13. The mounting area of the gas sensor 40 is isolated from the air passage inside the body by means of a protective wall 41, but communicates with the outside of the body through ventilation holes 42.

Figure 6:
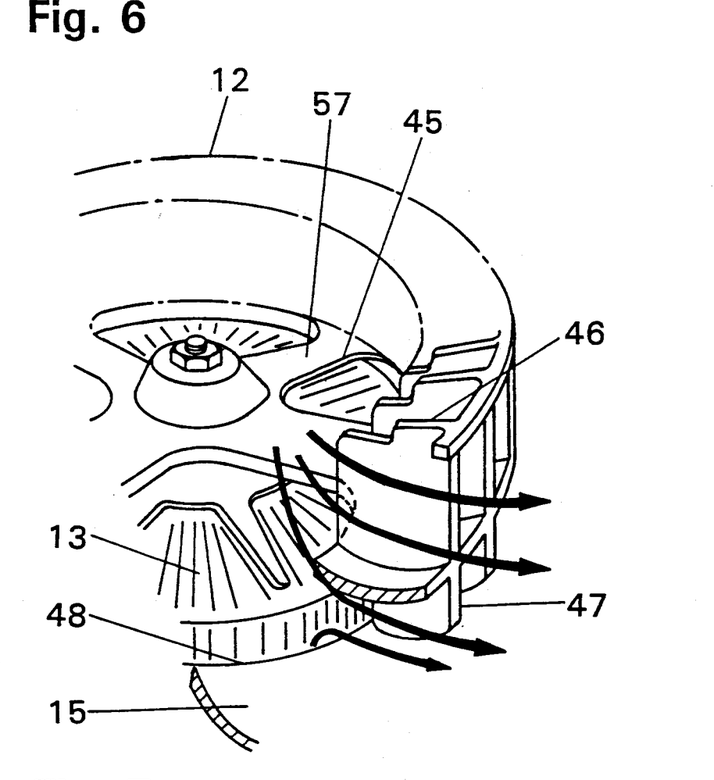
FIG. 6 is a perspective view of a fan with certain parts omitted.

As shown in FIG. 6, the fan 12 has a partition plate 57 in the center of which openings 45 are formed. Air drawn by the fan 12 passes through the openings 45 and is discharged to the outside by means of upper blades 46 and lower blades 47 provided respectively on the upper and lower sides of the partition plate 57.

An air opening 48 is provided between the partition 15 and the motor 13 (FIGS. 3 and 6) so that the air passed through the filter 20 is drawn by the fan 12 not only through the suction opening 17 but also by passing under the partition 15 and through the air opening 48. That is, the air drawn from both above and below the fan 12 through the suction opening 17 and the air opening 48 respectively is passed partly through the upper blades 46 and partly through the lower blades 47 according to the balance of the air volume sucked from above and below, and is discharged to the outside. Since the openings 45 are provided in the center of the fan 12, the air drawn from above and below the fan 12 can freely pass through the openings 45 to balance the airflow above and below the fan 12 so that the air can be discharged to the outside with minimum pressure loss.

Figure 15:
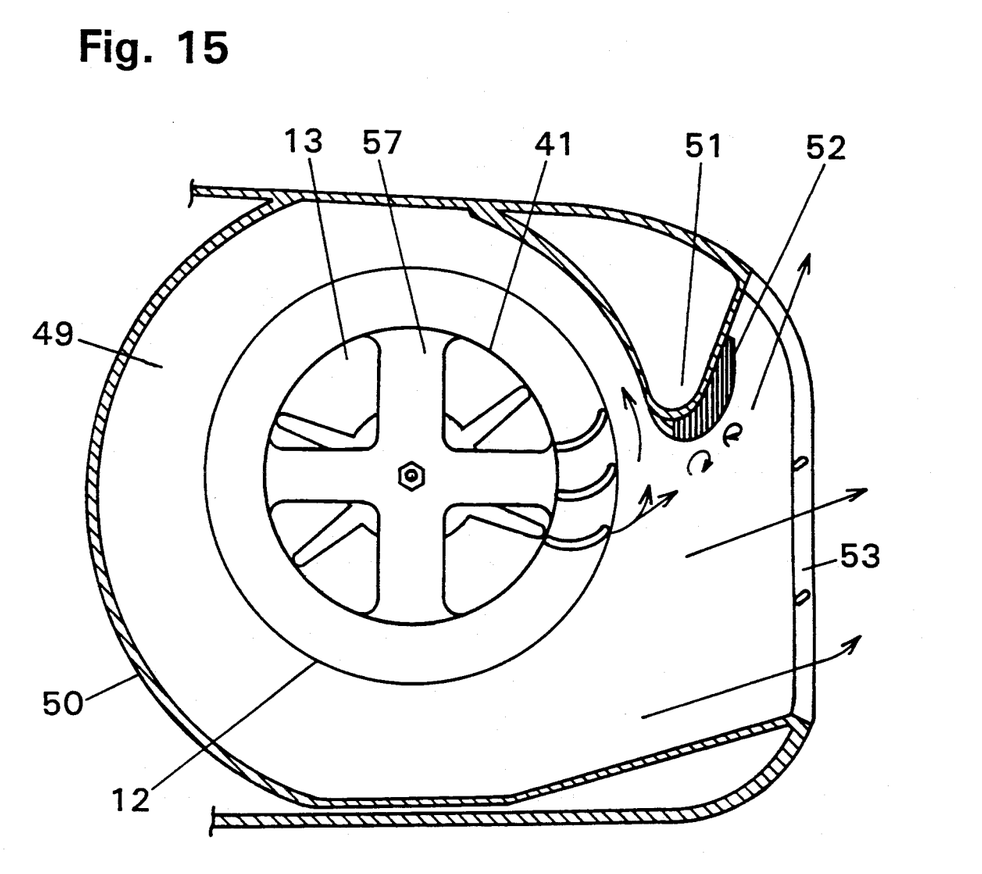
FIG. 15 is a cross sectional view showing a fan-mounted portion of the embodiment.

As shown in FIG. 15, a swirl chamber 49 shrouding the fan 12 is formed by the partition 15, the inside wall 16 (FIG. 3), and a side wall 50, and is provided with a tongue 51, the inner side of which is formed from a plastic material, and the outer side of which from a rubber 52.

In the vicinity of the tongue 51, air velocity is fast and the air is split into two portions, one being drawn back into the fan 12 and the other being discharged to the outside. To minimize turbulence in the airflow being drawn back into the fan 12, the inner surface of the tongue 51 is formed from a plastic material having a smooth surface to help the air to flow smoothly. On the other hand, a certain degree of turbulence is unavoidable in the air being discharged to the outside. The turbulence creates sound which reverberates against the wall of the tongue 51 and increases in volume as it passes through a bell-like outlet passage widening toward outlet openings 53 before being discharged to the outside.

In view of this problem, the tongue 51 at which turbulence is particularly likely to occur is provided with the rubber 52 on the side facing the outlet openings 53 so as to reduce the reverberation. This achieves a reduction in the discharge sound as compared with a case in which a plastic wall is used.

As shown in FIG. 3, a cushion 56 is provided in the center of the reverse side of a cover 55, and a support rib 34 protruding in approximately the middle part of the body 11 is abutted against the cushion 56 to prevent the cover 55 from vibrating.

In the above construction, air is drawn into the body 11 through the inlet openings 18, and fine particles of dust contained in the air are charged by means of the discharge device 19 and attracted to the electrostatic filter 30 (FIG. 7) in the filter 20 while particles of odor are caught by the activated charcoal filter 31.

Cleaned air passed through the filter 20 is drawn into the swirl chamber 49 through the suction opening 17 and the air opening 48, and is discharged to the outside through the outlet openings 53 by means of the fan 12.

The control circuit board 25 controls the operation of the motor 13 on the basis of the output of the gas sensor 40 which changes according to the concentration of smoke in the cabin.

It should be appreciated that the filter 20 is disposed by the side of the fan 12, both at approximately the same level of height, and that the inlet openings 18, the discharge device 19, the filter 20, the motor 13, the fan 12, and the outlet openings 53 are arranged horizontally at approximately the same level of height. Accordingly, the overall height of the body 11 is lower than that of the prior art construction, and therefore a better rear view field of the driver can be obtained.

The device accomplishing the above construction can be summarized as follows:

(1) The air drawn by the fan is drawn through the suction opening 17 disposed above the fan as well as the air opening 48 disposed therebelow. Since the partition plate 57 of the fan 12 is provided with the openings 45 formed in approximately the middle part thereof in addition to the upper blades 46 and the lower blades 47 formed thereon, the air drawn through the suction opening 17 and the air opening 48 can freely pass through the openings 45, the upper blades 46, and the lower blades 47 in such a manner as to balance the airflow above and below the fan 12 according to the suction volume of the air. This facilitates smooth discharge of the air with minimum pressure loss.

Thus, the above construction accomplishes a reduction in the height of the fan as compared with the prior art construction, and yet can attain the same airflow rate as the prior art construction even when the motor 13 has a construction projecting inside the fan.

(2) Since the filter 20 is disposed by the side of the motor 13 and is mounted in a V-shaped formed with its open side facing the suction side, the air entering through the inlet openings 18 can be directed almost horizontally through the filter 20, partly through the upper side and partly through the lower side thereof, into the rear section of the filter 20.

The above construction saves space in both directions along the length and height of the body while making effective use of the filter area for dust collection and allowing the air to flow downstream without changing its direction as it is drawn and therefore with minimum pressure loss.

The air is then passed smoothly for supply to the fan 12 which is drawing the air through the suction opening 17 disposed thereabove and through the air opening 48 disposed therebelow.

It is appreciated that the same effects can also be obtained when the filter is mounted in a U-shaped form.

(3) The control circuit board 25 is disposed beneath the filter 20, and the metal shield plate 26, which is provided to protect the circuit board 25 from the static electricity and the noise generated from the discharge device 19, is in contact with the filter 20 to provide a ground for the filter 20. This serves to omit parts otherwise needed for grounding the filter 20. Furthermore, since the shield plate 26 is protruding in the airflow passage, a heat dissipation effect can be obtained.

Also, a heat radiation fin 54 which is directly connected to the control circuit board 25 is mounted under the partition 15 near the air opening 48 where the air velocity is increased. This serves to enhance the heat dissipation effect without increasing the thickness.

(4) Since the filter 20, being bent in a V-shaped form, is inserted along the substantially V-shaped guide frame 33 extending integrally from the grating installed on the discharge device 19, a simple construction can be used to support the filter 20 in position. Also, since the guide frame 33 on which to support the filter 20 is constructed integrally with the discharge device 19, the filter 20 is supported in position in such a way as to shroud the downstream side of the discharge device 19. Such construction provides an excellent dust collecting effect without taking up much space.

Figure 16:
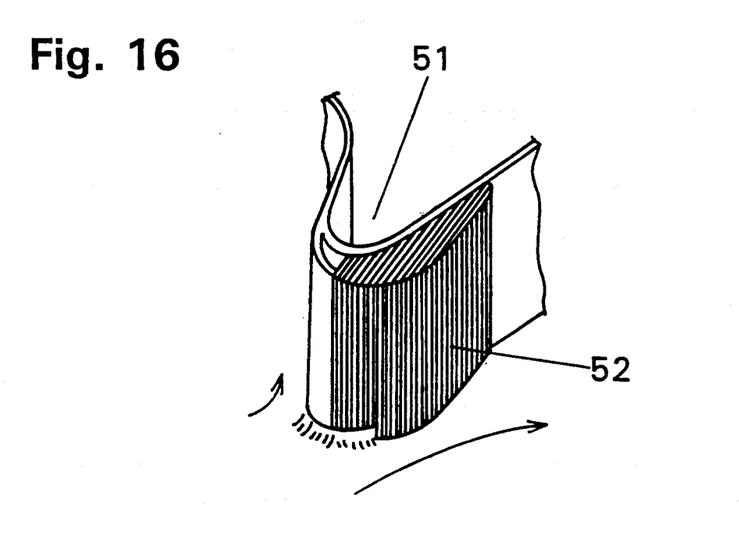
FIG. 16 is a perspective view of a tongue.

(5) To achieve a quieting effect from the construction, the side of the tongue 51 facing the fan is formed from a plastic material and the side thereof facing the outlet openings is formed from the rubber 52. This construction prevents the reverberation of the turbulent flow sound generated at the tongue 51 while allowing the air drawn back into the fan 12 to flow smoothly, thus achieving a quieting construction without reducing the airflow rate and without taking extra space. Furthermore, the cushion 56 and the support rib 34 prevent the cover from vibrating, thus further achieving a quieting construction.

Thus, the present invention provides a room air cleaner for use in automobiles which has a low profile construction thus assuring the driver of a wide rear view field and yet has an excellent air cleaning capacity.

Furthermore, the room air cleaner for use in automobiles of the present invention has such advantages as a quiet operating noise and a handy size.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A room air cleaner with an overall low profile construction for use in automobiles comprising:
    a housing and a cover which form a box-like boy,
    inlet and outlet openings formed in opposite sides of the box-like body, and
    a discharge device, a filter, and a motor-mounted fan shrouded by a swirl chamber serially arranged in the box-like body between the inlet and outlet openings, the fan including a partition plate having an upper surface including upper blades and a lower surface including lower blades, the lower blades encircling the fan motor mounted projectingly into the swirl chamber, the swirl chamber including an upper surface having a suction opening and a lower surface having an air opening whereby air is drawn by the fan into the swirl chamber from above the fan through the suction opening and from below the fan through the air opening.

2. A room air cleaner for use in automobiles according to claim 1, wherein the filter is formed in a bent shape having its open ends facing upstream.

3. A room air cleaner for use in automobiles according to claim 1, which further comprises a control circuit board disposed beneath the filter or controlling the motor, and a metal shield plate forming a shroud over the control circuit board and contacting the filter to ground the filter.

4. A room air cleaner for use in automobiles according to claim 1, which further comprises a plurality of openings formed in approximately the middle part of the partition plate of the fan to provide airflow passages above and below the partition plate.

5. A room air cleaner for use in automobiles according to claim 1, which further comprises a tongue formed in such a manner that the airflow is split into two portions, one of which is drawn back into the fan and the other is discharged into the outlet openings, a side of the tongue facing the fan being formed from a plastic material having a smooth surface and the other side of the tongue facing the outlet openings being formed from a vibration absorbing material.

6. A room air cleaner for use in automobiles according to claim 2, which further comprises a control circuit board disposed beneath the filter for controlling the motor, and a metal shield plate forming a shroud over the control circuit board and contacting the filter to ground the filter.

7. A room air cleaner for use in automobiles according to claim 4, which further comprises a tongue formed in such a manner that the airflow is split into two portions, one of which is drawn back into the fan and the other is discharged into the outlet openings, a side of the tongue facing the fan being formed from a plastic material having a smooth surface and the other side of the tongue facing the outlet openings being formed from a vibration absorbing material.

* * * * *